United States Patent
Nibe

(10) Patent No.: US 7,532,595 B2
(45) Date of Patent: May 12, 2009

(54) MOBILE TERMINAL APPARATUS AND CHANNEL COMPENSATION METHOD OF THE SAME

(75) Inventor: Keiji Nibe, Kawasaki (JP)

(73) Assignee: Fujitus Limited, Kawasaki (JP)

( * ) Notice: Subject to any disclaimer, the term of this patent is extended or adjusted under 35 U.S.C. 154(b) by 635 days.

(21) Appl. No.: 11/378,325

(22) Filed: Mar. 20, 2006

(65) Prior Publication Data

US 2007/0147289 A1 Jun. 28, 2007

(30) Foreign Application Priority Data

Dec. 28, 2005 (JP) ............................. 2005-377243

(51) Int. Cl.
*H04W 4/00* (2009.01)
*H04L 12/28* (2006.01)
*H04B 17/00* (2006.01)
*H04B 7/00* (2006.01)

(52) U.S. Cl. .................... 370/329; 370/431; 455/115.1; 455/226.1; 455/277.2

(58) Field of Classification Search ................ 455/522, 455/115.1, 226.1, 277.2; 370/252, 329, 431
See application file for complete search history.

(56) References Cited

U.S. PATENT DOCUMENTS

| | | | | |
|---|---|---|---|---|
| 7,236,474 | B2 * | 6/2007 | Seo et al. ................. | 370/329 |
| 7,403,513 | B2 * | 7/2008 | Lee et al. ................. | 37/342 |
| 2002/0097686 | A1 | 7/2002 | Qiu | |
| 2003/0108013 | A1 | 6/2003 | Hwang et al. | |
| 2003/0123396 | A1 * | 7/2003 | Seo et al. ................. | 370/252 |
| 2005/0143114 | A1 | 6/2005 | Moulsley et al. | |
| 2005/0213505 | A1 | 9/2005 | Iochi et al. | |
| 2006/0211391 | A1 * | 9/2006 | Nishikawa et al. ........ | 455/226.1 |
| 2007/0149149 | A1 * | 6/2007 | Nibe ....................... | 455/115.1 |
| 2008/0194282 | A1 * | 8/2008 | Nibe et al. .................. | 455/522 |

FOREIGN PATENT DOCUMENTS

| | | |
|---|---|---|
| EP | 1 517 499 A2 | 3/2005 |
| JP | 3471785 | 9/2003 |
| JP | 2005-510173 | 4/2005 |
| JP | 2005-522911 | 7/2005 |

OTHER PUBLICATIONS

Siemens: "Clarification of HS-SCCH reception", Oct. 10, 2003, 3GPP TSG-RAN WG1 Meeting #34, p. 3, XP002319290.

* cited by examiner

*Primary Examiner*—Tilahun B Gesesse
(74) *Attorney, Agent, or Firm*—Hanify & King, P.C.

(57) ABSTRACT

A mobile terminal includes a channel estimation processor to obtain the channel estimation value of a first channel reception signal in use of a plurality of known signals received from a base station within a channel estimation period; a channel compensation processor to perform a compensation process of the first channel reception signal in use of the channel estimation value; and a controller to control the channel estimation period so as to use a known signal which is received after the reception of the first channel reception signal for channel compensation. With this, throughput in downlink communication can be improved by controlling the deterioration of HS-SCCH reception quality itself without any particular transmission power control with the base station even under an environment such as high speed fading.

16 Claims, 12 Drawing Sheets

FIG. 3

CQI · SLIDE SYMBOL NUMBER CONVERTING TABLE (291)

| CQI | TRANSPORT BLOCK SIZE | HS-PDSCH DECODE PROCESSING TIME (ms) | SLIDE SYMBOL NUMBER |
|---|---|---|---|
| 1 | 137 | 0.5 | 10 |
| 2 | 173 | 0.5 | 10 |
| 3 | 233 | 0.5 | 10 |
| 4 | 317 | 0.5 | 10 |
| 5 | 377 | 0.5 | 10 |
| 6 | 461 | 0.5 | 10 |
| 7 | 650 | 0.5 | 10 |
| 8 | 792 | 0.5 | 10 |
| 9 | 931 | 0.5 | 10 |
| 10 | 1262 | 0.6 | 9 |
| 11 | 1483 | 0.6 | 9 |
| 12 | 1742 | 0.6 | 9 |
| 13 | 2279 | 0.6 | 9 |
| 14 | 2583 | 0.6 | 9 |
| 15 | 3319 | 0.6 | 9 |
| 16 | 3565 | 0.6 | 9 |
| 17 | 4189 | 0.7 | 8 |
| 18 | 4664 | 0.7 | 8 |
| 19 | 5287 | 0.7 | 8 |
| 20 | 5887 | 0.7 | 8 |
| 21 | 6554 | 0.8 | 7 |
| 22 | 7168 | 0.8 | 7 |
| 23 | 9719 | 0.9 | 6 |
| 24 | 11418 | 1.0 | 5 |
| 25 | 14411 | 1.1 | 4 |
| 26 | 17237 | 1.2 | 3 |
| 27 | 21754 | 1.4 | 1 |
| 28 | 23370 | 1.4 | 1 |
| 29 | 24222 | 1.5 | 0 |
| 30 | 25558 | 1.5 | 0 |

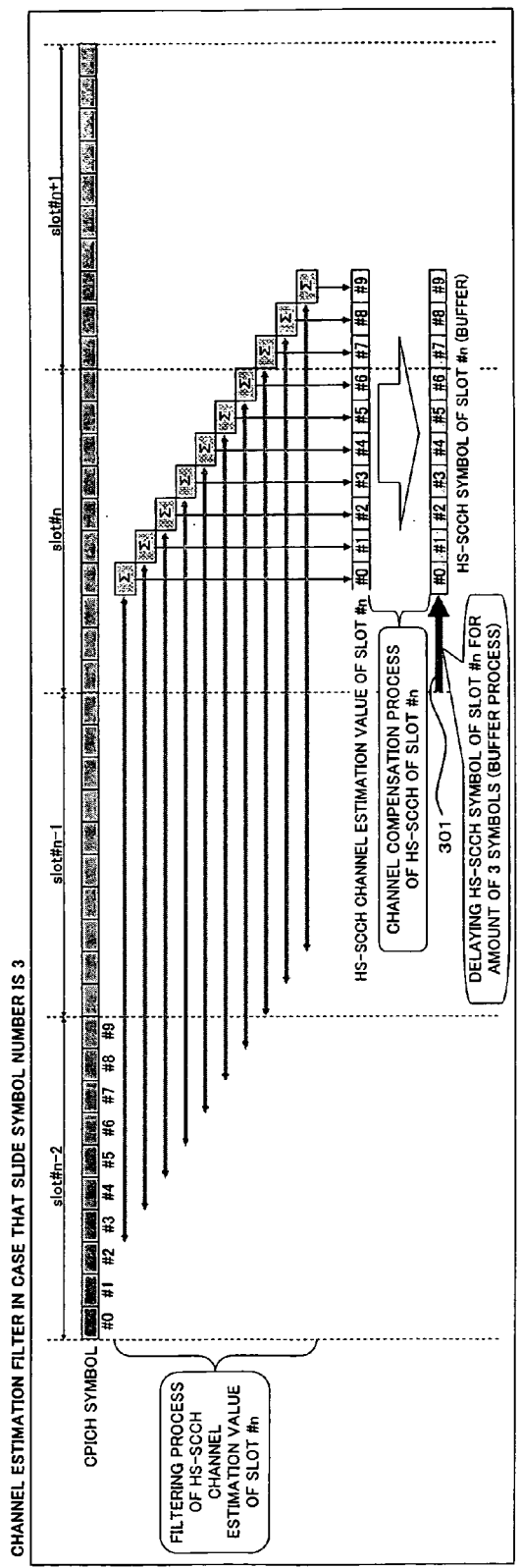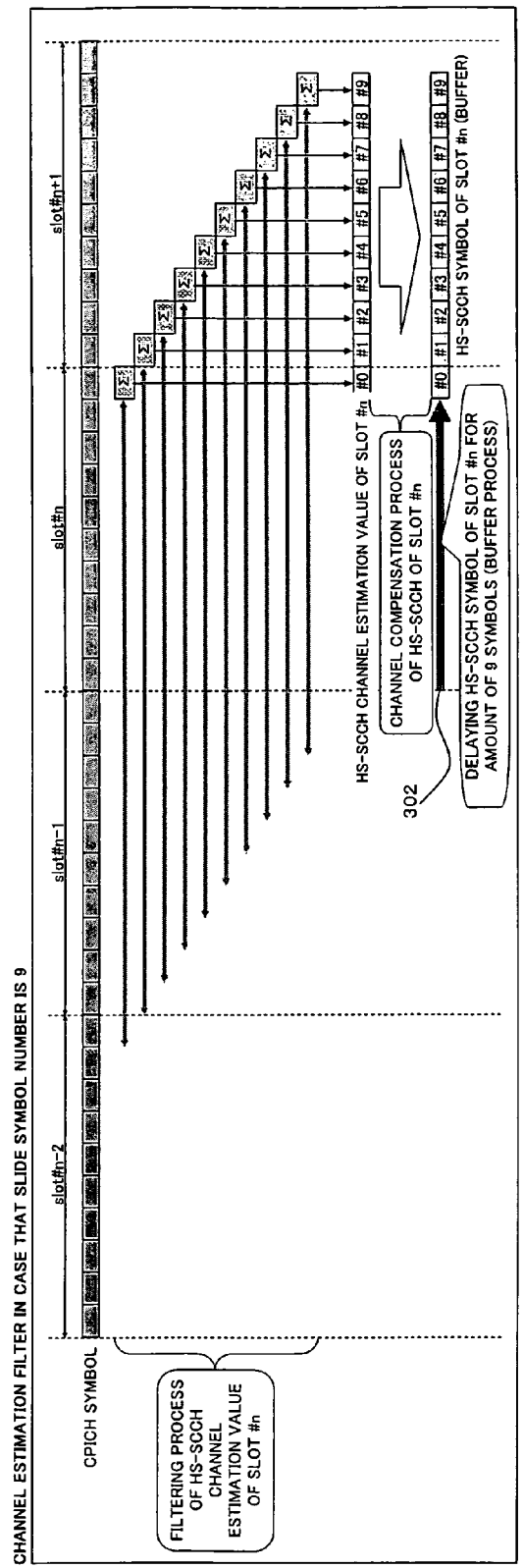

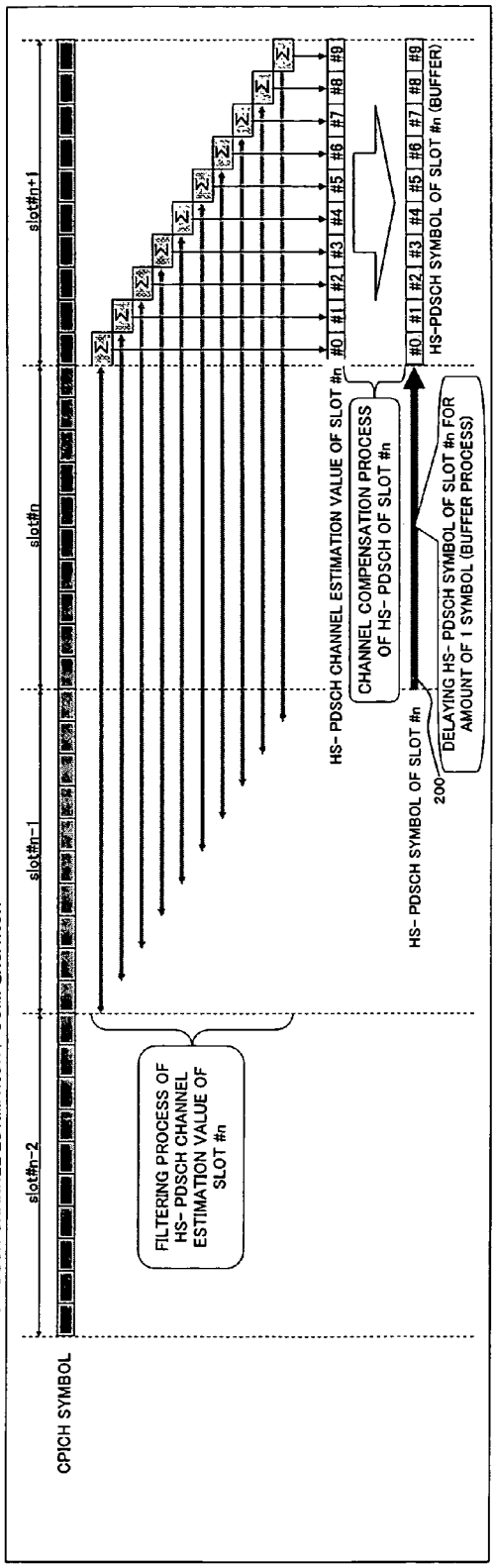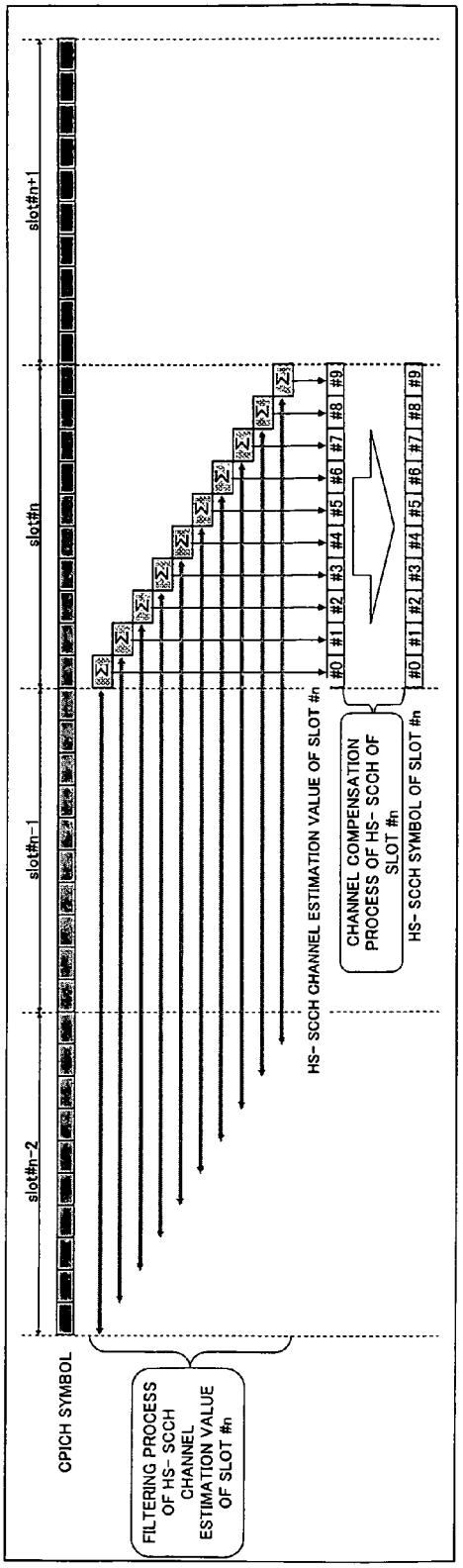

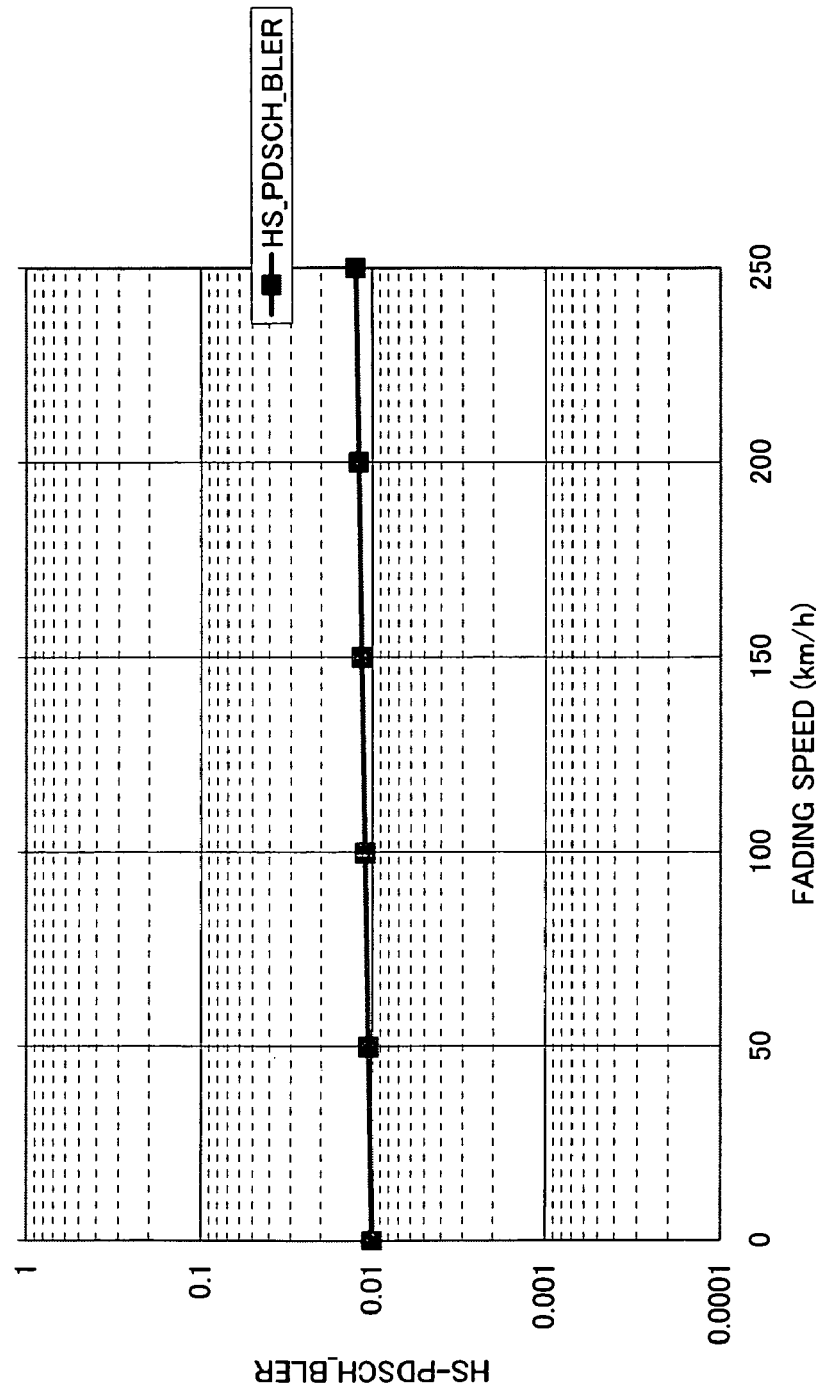

MOBILE TERMINAL APPARATUS AND CHANNEL COMPENSATION METHOD OF THE SAME

CROSS REFERENCE TO RELATED APPLICATIONS

This application is based on and hereby claims priority of Japanese Application No. 2005-377243 filed on Dec. 28, 2005 in Japan, the contents of which are hereby incorporated by reference.

BACKGROUND OF THE INVENTION (1) Field of the Invention

The present invention relates to a mobile terminal apparatus and a channel compensation method of the mobile terminal apparatus. The present invention relates to, for example, a preferable art employed in an apparatus for communicating by an HSDPA (High Speed Downlink Packet Access) transmission system, which is one of radio mobile terminal transmission systems.

(2) Description of Related Art

An HSDPA for providing maximum transmission rate of 14 Mbps in downlink communications from a base station apparatus (hereinafter, also referred to as "base station") to a mobile terminal apparatus (hereinafter, referred to as "mobile terminal") is specified in the 3GPP (the $3^{rd}$ Generation Partnership Project) as a theme of standardization of W-CDMA (Wideband-Code Division Multiple Access) system, which is one of the third generation mobile communication systems.

The HSDPA transmission system is an art for changing the number of multicodes, modulating system (such as QPSK or 16QAM), transmission block size (TBS: Transport Block Size) or the like of an HS-PDSCH (High Speed-Physical Downlink Shared Channel), which will be described later, in order to select the most appropriate transmission rate and perform communications in accordance with a reception environment where a mobile terminal is located.

The HSDPA employs an adaptive coding modulation system and, for example, it is characterized by adaptively switching QPSK modulation system and 16QAM system according to radio environment between a base station and a mobile terminal. Further, in order to realize the adaptive coding modulation system, a CQI (Channel Quality Indicator) for reporting reception environment from the mobile terminal to the base station is defined and formats of different transmission speed are defined as a CQI table according to the cases of CQI=1 to 30, for example.

The mobile terminal measures reception environment and, when assuming that an HS-PDSCH is received within 3 slots since a slot before CQI transmission under such environment, the mobile terminal reports a CQI which is the largest but below 'HS-PDSCH BLER (Block Error Rate)=0.1' or a CQI lower than that to the base station.

As major radio channels employed in the HSDPA, there are HS-SCCH (High Speed-Shared Control Channel), HS-PDSCH (High Speed-Physical Downlink Shared Channel), and HS-DPCCH (High Speed-Dedicated Physical Control Channel).

The HS-SCCH and the HS-PDSCH are both downlink shared channels and the HS-SCCH is a control channel for transmitting various parameters related to data transmitted on the HS-PDSCH. The various parameters include, for example, modulating type information indicating which modulation system is employed to transmit data on the HS-PDSCH, the number of allocation of spread coding (the number of codes), or pattern of rate matching process performed on transmission data.

The HS-DPCCH is an uplink dedicated control channel from the mobile terminal to the base station. The HS-DPCCH is used when the mobile terminal transmits an ACK signal and a NACK signal to the base station according to a result of data reception of HS-PDSCH.

The HS-DPCCH is also used when the mobile terminal measures reception quality (for example, SIR: Signal Interference Ratio) of the reception signal from the base station and periodically transmits the result to the base station as CQI (see FIG. 9). The base station determines the downlink radio environment based on the received CQI. When the environment is good, the base station may switch to a modulation system for faster data transmission rate and when the environment is not good, the base station adaptively switches to a modulation system for slower data transmission rate.

(Channel structure)

A channel structure of HSDPA will be described.

FIG. 9 is a diagram showing a channel structure of HSDPA. It is noted that, in W-CDMA system, each channel is separated by coding to be adapted to code division multiplex system.

Firstly, channels, which are yet to be described among the channels shown in FIG. 9, will be described.

A CPICH (Common Pilot Channel) and a P-CCPCH (Primary Common Control Physical Channel) are respectively downlink shared channels. The CPICH is a channel used for channel estimation, cell search, and a timing basis of other downlink physical channels in the same cell and used to transmit so-called pilot signals (known signals between the base station and the mobile terminal). The P-CCPCH is a channel for transmitting broadcasting information.

Next, timing relationship in each channel will be described.

As shown in FIG. 9, each channel includes a frame (10 ms) that is composed of 15 slots. As described above, the CPICH is used as a basis of other channels and the beginning of frames of the P-CCPCH and HS-SCCH is respectively corresponding to the beginning of a frame of the CPICH. Here, the beginning of a frame of the HS-PDSCH is delayed by 2 slots with respect to that of HS-SCCH.

This delay is provided in order to notify, in advance, modulating type information or spread code information, via the HS-SCCH, which are required for demodulating the HS-PDSCH in the mobile terminal.

Accordingly, the mobile terminal performs HS-PDSCH demodulation or the like by selecting the corresponding demodulating system and despreading code according to the notified information via the HS-SCCH. Further, the HS-SCCH and the HS-PDSCH includes a sub-frame composed of 3 slots. The foregoing is the brief description of the HSDPA channel structure.

(Structure of Mobile Terminal)

FIG. 10 shows an example of a structure of a relevant part of a known mobile terminal (mobile terminal apparatus) adapted to HSDPA. As shown in FIG. 10, the mobile terminal includes, for example, a receiver 101, a CQI reporting value calculator 102, an HS-SCCH channel estimation filter 103, an HS-SCCH channel compensator 104, an HS-SCCH demodulator 105, an HS-SCCH decoder/CRC calculator 106, an HS-PDSCH symbol buffer 107, an HS-PDSCH channel estimation filter 108, an HS-PDSCH channel compensator 109, an HS-PDSCH demodulator 110, an HS-PDSCH decoder 111, an HS-PDSCH-CRC calculator 112, a downlink reception timing monitor 113, an uplink transmission timing manager 114, a scheduler 115, an encoder 116, a modulator 117, and a transmitter 118.

In the mobile terminal shown in FIG. 10, a reception signal received by a reception antenna (not shown) is input into the receiver 101. The receiver 101 performs processes such as path detection or despreading for downlink and separates each channel of CPICH, HS-SCCH, and HS-PDSCH. The separated CPICH is input into the CQI reporting value calculator 102, the HS-SCCH channel estimation filter 103, and the HS-PDSCH cannel estimation filter 108, respectively.

The CQI reporting value calculator 102 obtains a reception SIR based on a pilot signal (CPICH symbol) received via CPICH and calculates a CQI reporting value corresponding to the reception SIR. The HS-SCCH channel estimation filter 103 and the HS-PDSCH channel estimation filter 108 calculate channel estimation values of HS-SCCH and HS-PDSCH respectively based on to the reception pilot signals.

On the HS-SCCH separated in the receiver 101, the HS-SCCH channel compensator 104 performs channel compensation in use of a channel estimation value obtained in the HS-SCCH channel estimation filter 103, the HS-SCCH demodulator 105 performs demodulation, and the HS-SCCH decoder/CRC calculator 106 performs decoding and CRC calculation (error check). Since the information decoded in the HS-SCCH decoder/CRC calculator 106 includes, as described above, information required for HS-PDSCH decoding such as modulating type information and spread code information, it is provided to the HS-PDSCH decoder 111. Here, when the result of HS-SCCH CRC calculation is NG, an error (DTX) is notified to the scheduler 115 in order to notify the base station.

On the other hand, the reception signal of the HS-PDSCH (HS-PDSCH symbol) which is separated in the receiver 101 is firstly buffered and delayed in the HS-PDSCH symbol buffer 107. Then, the HS-PDSCH channel compensator 109 performs channel compensation in use of the channel estimation value obtained in the HS-PDSCH channel estimation filter 108 and the HS-PDSCH demodulator 110 performs demodulation. Here, as described later with reference to FIG. 11, the HS-PDSCH symbol is delayed in the HS-PDSCH symbol buffer 107 since it is preferable to use a channel estimation value that is calculated by averaging CPICH symbols of a plurality of past and future slots with respect to a target HS-PDSCH slot of the demodulation.

On the demodulated HS-PDSCH, the HS-PDSCH decoder 111 decodes in use of spread code information obtained in the HS-PDSCH decoder/CRC calculator 106 and the HS-PDSCH-CRC calculator 112 performs CRC calculation. Then, the calculation result (OK or NG) is transmitted to the scheduler 115 as ACK/NACK.

The scheduler 115 schedules a CQI reporting value from the CQI reporting value calculator 102, DTX from the HS-SCCH decoder/CRC calculator 106, and ACK/NACK from the HS-PDSCH-CRC calculator 112, respectively, in accordance with a transmission timing signal from the uplink transmission timing manager 114. That is, as shown in the last line in FIG. 9, the scheduler 115 schedules so that the CQI reporting value is transmitted about 2.5 slots later from the reception of HS-PDSCH and ACK/NACK (/DTX) are respectively transmitted about 7.5 slots later from the completion of receiving the HS-PDSCH. Here, the reception of HS-PDSCH is monitored by the downlink reception timing monitor 113.

On each information scheduled as described above, the encoder 116 encodes as HS-DPCCH data and the modulator 117 modulates. Then, the transmitter 118 transmits that information to the base station via HS-DPCCH. The base station transmits new data when receiving ACK, retransmits HS-SCCH and HS-PDSCH when receiving DTX, and retransmits HS-PDSCH when receiving NACK.

As described above, a mobile terminal of HSDPA firstly decodes HS-SCCH and then decodes HS-PDSCH in use of the decoding result of HS-SCCH. Accordingly, in general, a channel having higher error tolerance (better reception quality) is allocated for HS-SCCH than the case of HS-PDSCH.

It is noted that there are some arts disclosed in the following patent publications (1) to (3), which are related to HSDPA.

(1) Japanese Patent No. 3471785 discloses an art in which a base station performs a reliability determination process on ACK/NACK region of uplink HS-DPCCH in order to reduce phenomena of incorrect reception of ACK which is NACK in actual. In other words, according to the art of Japanese Patent No. 3471785, cases which are likely to include an error in an uplink ACK signal are detected to revise the signal as an NACK signal, so that lack in downlink data can be improved.

(2) Published Japanese translation of a PCT application, No. 2005-522911 discloses an art in which power control is performed on an ACK/NACK region of uplink HS-DPCCH (transmission power is increased when there is a possibility of incorrect reception of ACK/NACK signals) in order to reduce incorrect reception of ACK/NACK signals in a base station.

(3) Published Japanese translation of a PCT application, No. 2005-510173 discloses an art to appropriately perform power control of uplink HS-DPCCH.

FIG. 11 is a diagram showing a time chart image of HS-PDSCH channel estimation and compensation performed in the mobile terminal shown in FIG. 10 by symbol unit. FIG. 12 is a diagram showing a time chart image of HS-SCCH channel estimation and compensation performed in the mobile terminal shown in FIG. 10 by symbol unit.

In FIGS. 11 and 12, the number of symbols in a single slot is defined as 10 from #0 to #9.

In HS-PDSCH modulation in the mobile terminal, in order to modulate a slot (e.g. slot #n in FIG. 11), a channel estimation value which is appropriate to the time of slot #n is required to be calculated from a CPICH symbol to carry out a modulation process on an HS-PDSCH symbol. Accordingly, the channel estimation value which is appropriate to the time of slot #n (filtering process) is preferably calculated by averaging (each "Σ" in FIGS. 11 and 12 represents an averaging process) past and future CPICH symbols (slot #n−1 to slot #n+1), however, in this case, it gets to the time of slot #n+1 before the channel estimation process is completed.

Therefore, in the mobile terminal, as indicated by an arrow 200 in FIG. 11, the HS-PDSCH symbol buffer 107 delays an HS-PDSCH symbol of slot #n and a modulation process is performed at the time from slot #n+1 to slot #n+2.

Here, it is specified that, in HSDPA, as described above, ACK/NACK signal is transmitted to the base station at 7.5 slots later from the completion of HS-PDSCH reception and HS-PDSCH is received at 2 slots later from the reception of HS-SCCH. In order to complete an HS-PDSCH decode process on a data signal transmitted by about 14 Mbps, which is the maximum throughput in HSDPA, before ACK/NACK(/DTX) transmission, information required for HS-PDSCH decoding (HS-PDSCH decode information) needs to be obtained by performing the HS-SCCH demodulate and decode processes within one slot.

Therefore, in order to demodulate a slot of HS-SCCH (e.g. slot #n in FIG. 12), for example, it is preferable to perform a modulation process in use of a channel estimation value calculated from past and future CPICH symbols with respect to the reception symbol (e.g. CPICH symbols from slot #n−1 to slot #n+1) by delaying HS-SCCH reception symbol by one slot (buffering process) similar to the demodulation process of HS-PDSCH. However, because of the above temporal restriction, the HS-SCCH reception symbol cannot be delayed (buffered).

Therefore, for demodulation of HS-SCCH on slot #n, future CPICH symbol cannot be used and a demodulation process is performed in use of a channel estimation calculated from only past CPICH symbols (e.g. CPICH symbols from slot #n−2 to slot #n).

In other words, in FIG. 11, focusing attention on symbol #0 of slot #n, channel estimation value filtering for symbol #0 of HS-PDSCH is performed in use of CPICH symbols from the first CPICH symbol in the past slot #n−1 to the last CPICH symbol in the future slot #n. Accordingly, a channel estimation value can be calculated from past and future CPICH symbols (slot #n−1 to slot #n+1) with respect to the time of symbol #0 of HS-PDSCH.

On the contrary, as shown in FIG. 12, since channel estimation filtering for symbol #0 in slot #n of HS-SCCH needs to be performed by the last CPICH symbol in past slot #n−1, the filtering is performed in use of CPICH symbols from the first symbol in slot #n−2 to the last symbol in slot #n−1.

Therefore, since a channel estimation value with respect to the time of the first symbol in slot #n−1 of HS-SCCH (one slot prior to the time of symbol #0) is calculated, a channel estimation value which is not appropriate to the time of symbol #0 may be calculated in some reception environment. As a result, the reception quality of HS-SCCH is often lower than the reception quality of HS-PDSCH in an environment in which a channel estimation result may be changed within a short time by high speed fading or the like and a past estimation value and a current channel estimation value are different.

As described above, in general, a channel having higher error tolerance is allocated to HS-SCCH than HS-PDSCH so that the reception quality is usually better in HS-SCCH than in HS-PDSCH. However, because of the temporal restriction for the demodulation process, only past CPICH symbols may be used for the channel estimation value for HS-SCCH modulation. As a result, the relation of reception quality in HS-SCCH and HS-PDSCH is reversed in some radio environment of high speed fading.

Such phenomenon will be explained with reference to FIGS. 13 and 14. FIG. 13 is a graph quantitatively showing HS-PDSCH BLER (Block Error Rate) characteristics when receiving a fixed format corresponding to a fading speed. FIG. 14 is a graph quantitatively showing HS-SCCH BLER characteristics corresponding to a fading speed.

As shown in FIG. 13, BLER of HS-PDSCH is approximately constant with respect to a fading speed; however, as shown in FIG. 14, BLER of HS-SCCH is deteriorated as the fading speed increases. In this manner, the reception quality of HS-SCCH tends to be deteriorated comparing to the reception quality of HS-PDSCH under an environment, such as fading environment, in which temporal phase changes are quantitatively generated.

Therefore, in case of high speed fading, even when the reception quality of HS-PDSCH is comparatively good, the reception quality of HS-SCCH is deteriorated. Accordingly, the CRC calculation result of HS-SCCH is determined as NG and a decode process of HS-PDSCH cannot be performed. As a result, a reception speed is reduced and throughput in the mobile terminal and throughput in the system may be decreased.

According to the arts in Japanese Patent No. 3471785, Published Japanese translation of a PCT application, No. 2005-522911, and Published Japanese translation of a PCT application, No. 2005-510173, an ACK signal which is likely to be incorrect is revised to NACK signal, or transmission power control is performed in order to reduce incorrect reception of ACK/NACK signals and lack of downlink data. However, any of those arts cannot adaptively improve the HS-SCCH reception quality itself without particular transmission power control with the base station.

SUMMARY OF THE INVENTION

The present invention has been made in view of the above problems and has an object of improving throughput in downlink communications without any particular transmission power control with a base station apparatus to control deterioration of HS-SCCH reception quality itself even in a radio environment such as high speed fading.

In order to achieve the object, the present invention employs a mobile terminal apparatus and a channel compensation method in the mobile terminal apparatus as follows.

(1) The mobile terminal of the present invention is a mobile terminal apparatus for decoding a first channel reception signal received from a base station apparatus after a channel compensation process in use of a channel estimation value so as to carry out a decode process on a second channel reception signal received from the base station apparatus in use of the decoding result of the first channel reception signal, wherein a period of time from a completion of receiving said second channel reception signal to a completion of decoding the second channel reception signal is regulated as a predetermined time, said apparatus comprising: a channel estimation processor configured to obtain the channel estimation value of said first channel reception signal by using a plurality of known signals received from the base station apparatus within a channel estimation period; a channel compensation processor configured to carry out a channel compensation process of said first channel reception signal by using the channel estimation value obtained by said channel estimation processor; and a controller configured to control said channel estimation period so as to include a known signal which is received after the reception of said first channel reception signal for channel compensation into said plurality of known signals in accordance with remaining time from completion of the decoding process on said second channel reception signal until the end of said predetermined time.

(2) The controller may include a reception quality information detector configured to detect reception quality information, from said known signals, which is used as a determinant factor of the transmission data amount of said second channel in the base station apparatus and is reported to the base station apparatus; a remaining time calculator configured to obtain said remaining time based on said reception quality information detected by the reception quality information detector; and a delay processor configured to delay said first channel reception signal in accordance with said remaining time obtained by the remaining time calculator so as to input into the channel compensation processor parallel to the channel estimation value obtained by the channel estimation processor.

(3) The controller may include a fading speed measurer configured to measure a fading speed; and a weighting controller configured to control weighting of said plurality of known signals during said channel estimation period in accordance with the fading speed measured by the fading speed measurer.

(4) The weighting controller may be configured to assign a greater weight to the known signal that is received later during said channel estimation period as the fading speed measured by the fading speed measurer is faster.

(5) The controller may include an error rate measurer configured to measure an error rate of said first channel reception signal; and a reception quality information revising reporter configured to report lower reception quality information than the reception quality information detected by the reception quality information detector to the base station apparatus so as to reduce the amount of transmission data of said second channel from the base station apparatus and increase said remaining time when the error rate measured by the error rate measurer is lower than a predetermined value.

(6) The method of channel compensation in the mobile terminal apparatus of the present invention is a method of channel compensation in a mobile terminal apparatus for decoding a first channel reception signal received from a base station apparatus after a channel compensation process by using a channel estimation value so as to carry out a decode process on a second channel reception signal received from the base station apparatus in use of the decoding result of the first channel reception signal, wherein a period of time from a completion of receiving said second channel reception signal to a completion of decoding the second channel reception signal is regulated as a predetermined time, said method comprising: a channel estimating step for obtaining the channel estimation value of said first channel reception signal by using a plurality of known signals received from the base station apparatus within a channel estimation period; a channel compensating step for performing channel compensating process for said first channel reception signal by using the channel estimation value obtained in the channel estimating step; and a controlling step for controlling said channel estimation period so as to include a known signal which is received after the reception of said first channel reception signal for channel compensation into said plurality of known signals in accordance with remaining time from a completion of the decoding process on said second channel reception signal until the end of said predetermined time.

(7) The controlling step may include a reception quality information detecting step for detecting reception quality information, from said known signals, which is used as a determinant factor of the transmission data amount of said second channel in the base station apparatus and is reported to the base station apparatus; a remaining time calculating step for calculating said remaining time based on said reception quality information detected in the reception quality information detecting step; and a delay processing step for delaying said first channel reception signal in accordance with said remaining time obtained in the remaining time calculating step so as to use in the channel compensating step with said channel estimation value in parallel.

(8) The controlling step may include a fading speed measuring step for measuring a fading speed; and a weighting controlling step for controlling weighting of said plurality of known signals during said channel estimation period in accordance with the fading speed measured in the fading speed measuring step.

(9) In the weighting controlling step, a greater weight may be assigned to the known signal that is received later during said channel estimation period as the fading speed measured in the fading speed measuring step is faster.

(10) The controlling step may include an error rate measuring step for measuring an error rate of said first channel reception signal; and a reception-quality-information-revising reporting step for reporting lower reception quality information than the reception quality information detected in the reception quality detecting step to the base station apparatus so as to reduce the amount of transmission data of said second channel from the base station apparatus and increase said remaining time when the error rate measured in the error rate measuring step is lower than a predetermined value.

According to the present invention, at least the following advantages can be provided.

(1) A channel estimation period can be controlled so as to optimally include a future known signal which is received after reception of the first signal and the accuracy of the channel estimation value of the first channel can be improved without any particular transmission power control with a base station apparatus even under an environment such as high speed fading environment, in which reception environment is not good and reception characteristics of the first channel are deteriorated. Therefore, reception characteristics of the first channel can be improved, and reception characteristics of the second channel can be also improved. As a result, a reception speed in the mobile terminal apparatus is increased so that improvement of throughput in the mobile terminal apparatus and throughput in the system can be achieved.

(2) Since a delay processor for delaying the first channel reception signal in accordance with the remaining time and inputting the same into the channel compensation processor in parallel with the channel estimation value obtained by the channel estimation processor is provided, the channel estimation period can be controlled. Further, the single channel estimation processor can obtain channel estimation values of different channel estimation periods, so that it contributes significantly to a simplification of structure of the apparatus.

(3) Further, a weighting controller controls weighting of a plurality of given signals during the channel estimation period in accordance with the fading speed. For example, the weighting controller assigns a greater weight to a given signal which is received later during the channel estimation period as the fading speed is faster. Accordingly, accuracy of the channel estimation value of the first channel can be further improved so as to further improve the reception characteristic of the first channel.

(4) When an error rate of the first channel reception signal becomes lower than a predetermined value, lower reception quality information is reported to the base station apparatus. Accordingly, the amount of transmission data in the second channel from the base station apparatus is reduced and the remaining time can be positively extended on the initiative of the mobile terminal apparatus. Therefore, even when the error rate of the first channel is deteriorated, accuracy of the channel estimation value of the first channel can be improved on the initiative of the mobile terminal apparatus so that the reception characteristic of the first channel is positively improved.

(5) The above processes are all performed only in the mobile terminal apparatus side and any particular change is not required to the base station apparatus. Therefore, it is great in versatility.

BRIEF DESCRIPTION OF THE DRAWINGS

FIG. 3 is a diagram showing an example of a CQI/slide symbol number converting table according to the first embodiment;

FIG. 4 is a diagram showing a time chart image of HS-SCCH channel estimation/compensation (in case that slide symbol number is 3) by symbol unit according to the first embodiment;

FIG. 5 is a diagram showing a time chart image of HS-SCCH channel estimation/compensation (in case that slide symbol number is 9) by symbol unit according to the first embodiment;

FIG. 11 is a diagram showing a time chart image of HS-PDSCH channel estimation/compensation by symbol unit, which are performed in the mobile terminal of FIG. 10;

FIG. 12 is a diagram showing a time chart image of HS-SCCH channel estimation/compensation by symbol unit, which are performed in the mobile terminal of FIG. 10;

FIG. 13 is a graph quantitatively showing BLER characteristic of HS-PDSCH corresponding to a fading speed in the mobile terminal of FIG. 10, when a fixed format is received.

DESCRIPTION OF THE PREFERRED EMBODIMENTS

(A) Brief Overview

Figure 1:
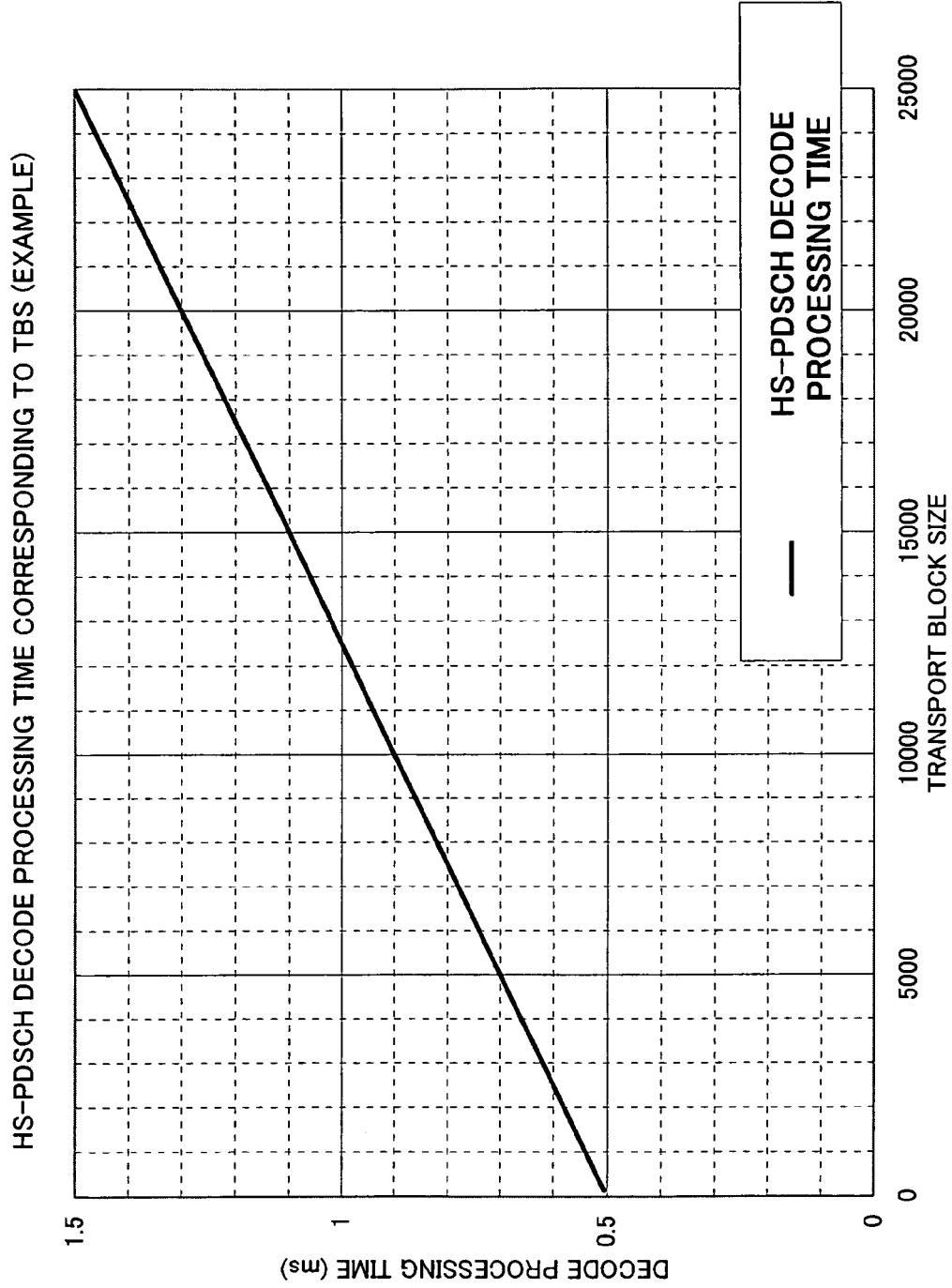
FIG. 1 is a graph showing an example of HS-PDSCH decode processing time corresponding to TBS.
Figure 9:
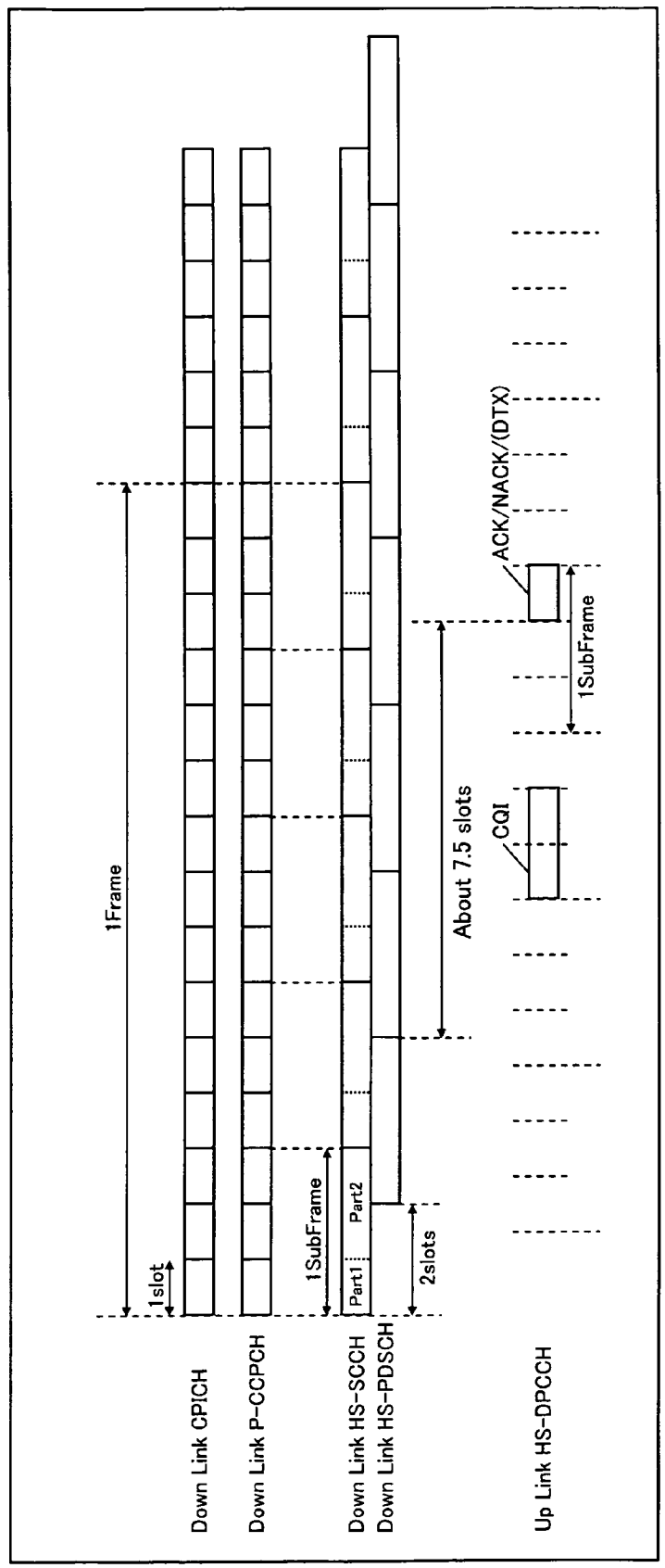
FIG. 9 is a diagram showing a channel structure in HSDPA.

A period of time required for HS-PDSCH decode process mainly depends on a Transport Block Size (TBS) transmitted from a base station. For example, as shown in FIG. 1, a period of time required for HS-PDSCH decode process becomes smaller as TBS becomes smaller. Here, FIG. 1 shows that a period of time required for HS-PDSCH decode process is 1.5 ms (that corresponds to the amount of 7.5 slots as described in FIG. 9) in case of a maximum TBS ($\approx$25000).

Since TBS transmitted from the base station depends on a CQI reporting value transmitted from a mobile terminal, TBS of HS-PDSCH transmitted from the base station can be calculated from the reported CQI.

Here, in a channel estimation process and channel compensation process of HS-SCCH, TBS of HS-PDSCH transmitted from the base station is calculated in use of the CQI reporting value transmitted from the mobile terminal. Then, a period of time required for decode process of HS-PDSCH is calculated so as to calculate a period of time which can be used for HS-SCCH channel estimation process. Based on the calculated period of time, received HS-SCCH symbol is delayed (buffer process) by a symbol unit and a channel estimation filter range is set as the most appropriate range. As a result, accuracy of a channel estimation value of HS-SCCH is increased and reception characteristics of HS-SCCH are improved.

Further, BLER of HS-SCCH is measured and when an error rate exceeds a predetermined value, a lower CQI reporting value is reported to the base station. TBS transmitted from the base station is made smaller so as to increase a period of time which can be spent for channel estimation process of HS-SCCH. Also, the channel estimation filter range of HS-SCCH is set as the most appropriate range so as to improve the error rate of HS-SCCH.

With this method, reception characteristics of HS-SCCH are improved so that throughput in the mobile terminal can be improved.

Means for realizing the above method will be described with reference to the drawings.

(B) First Embodiment

Figure 2:
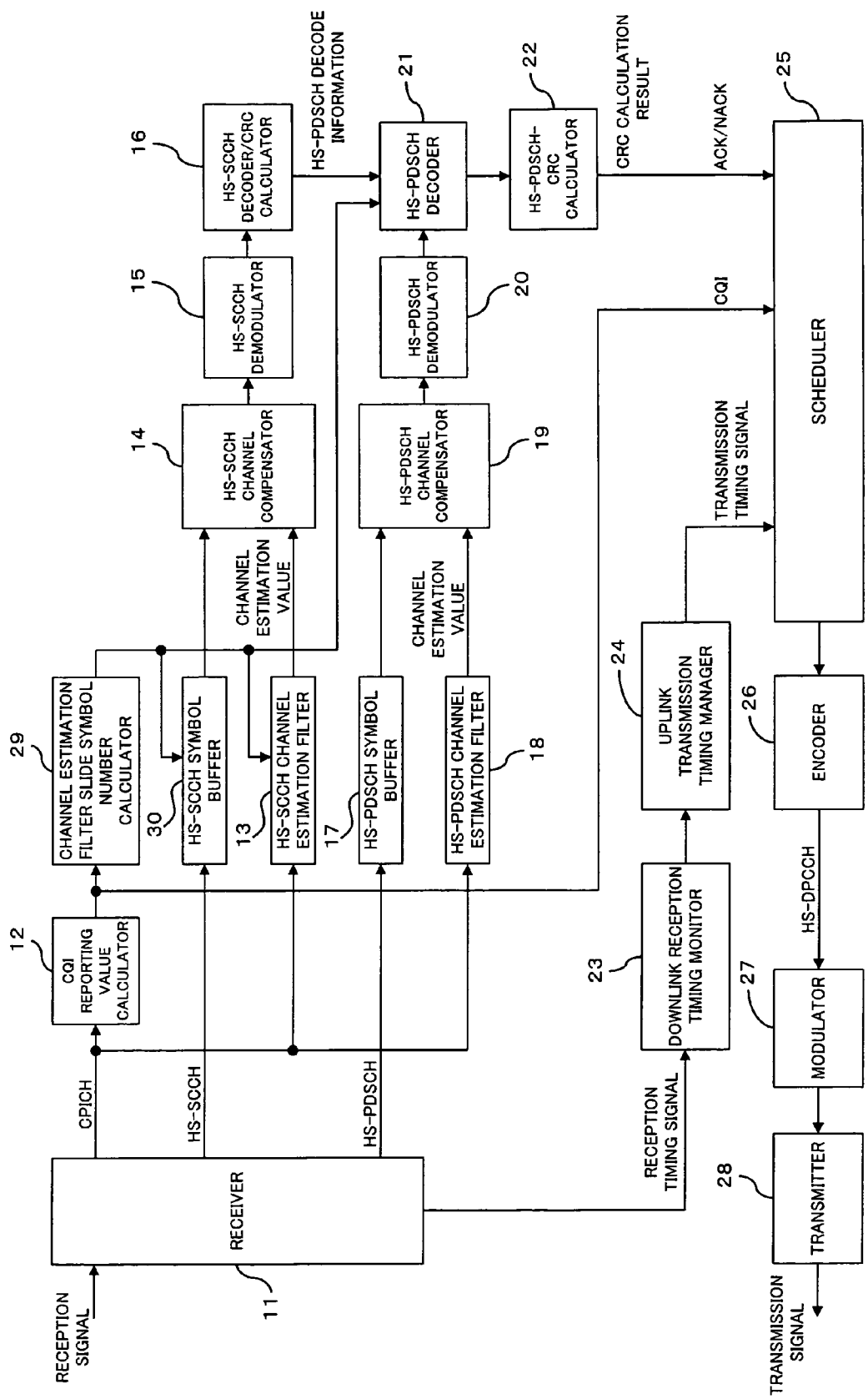
FIG. 2 is a block diagram showing a structure of a relevant part of a mobile terminal adapted to HSDPA according to a first embodiment of the present invention.
Figure 10:
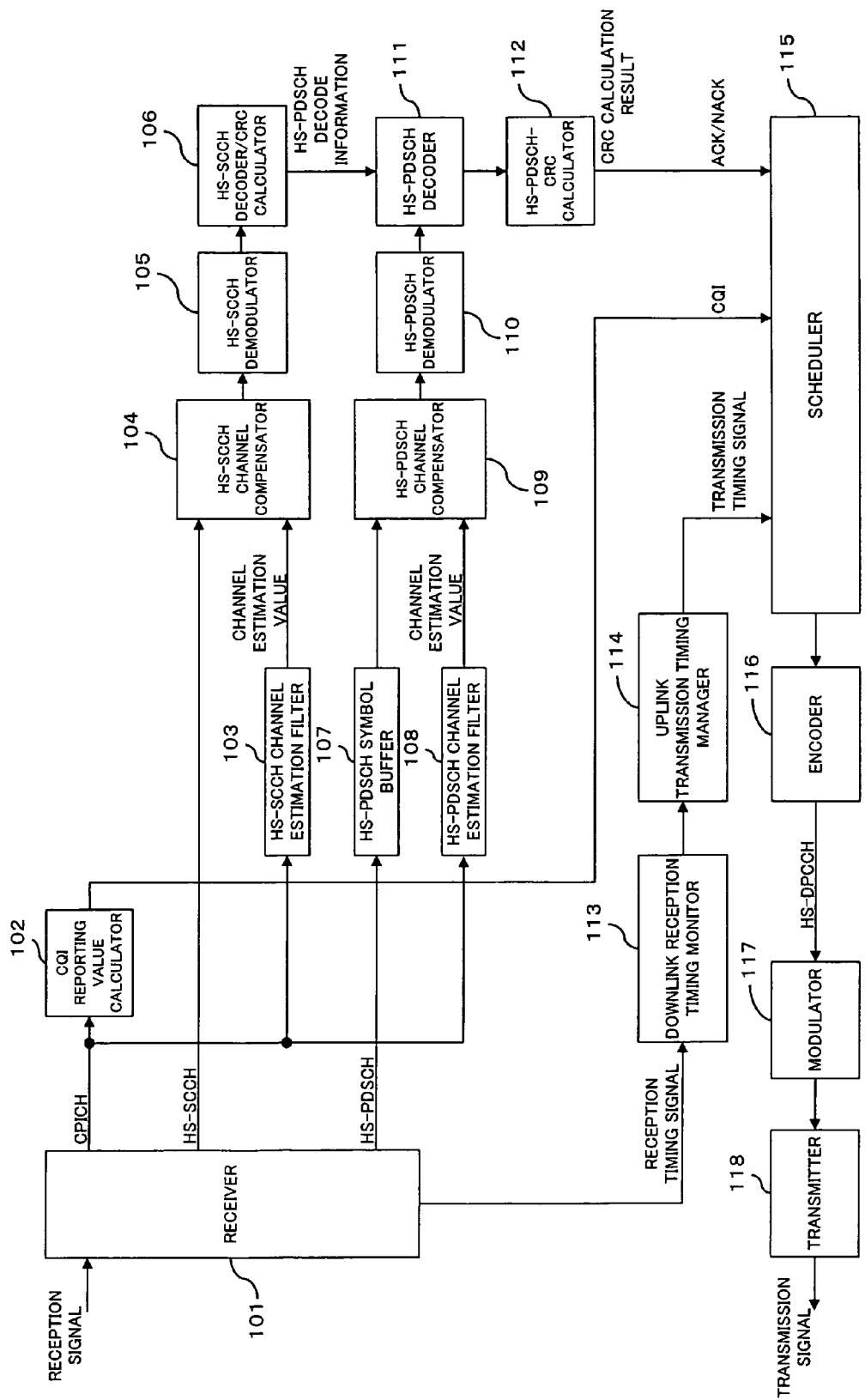
FIG. 10 is a block diagram showing an example of a structure of a relevant part of a conventional mobile terminal (mobile terminal apparatus) adapted to HSDPA.
Figure 14:
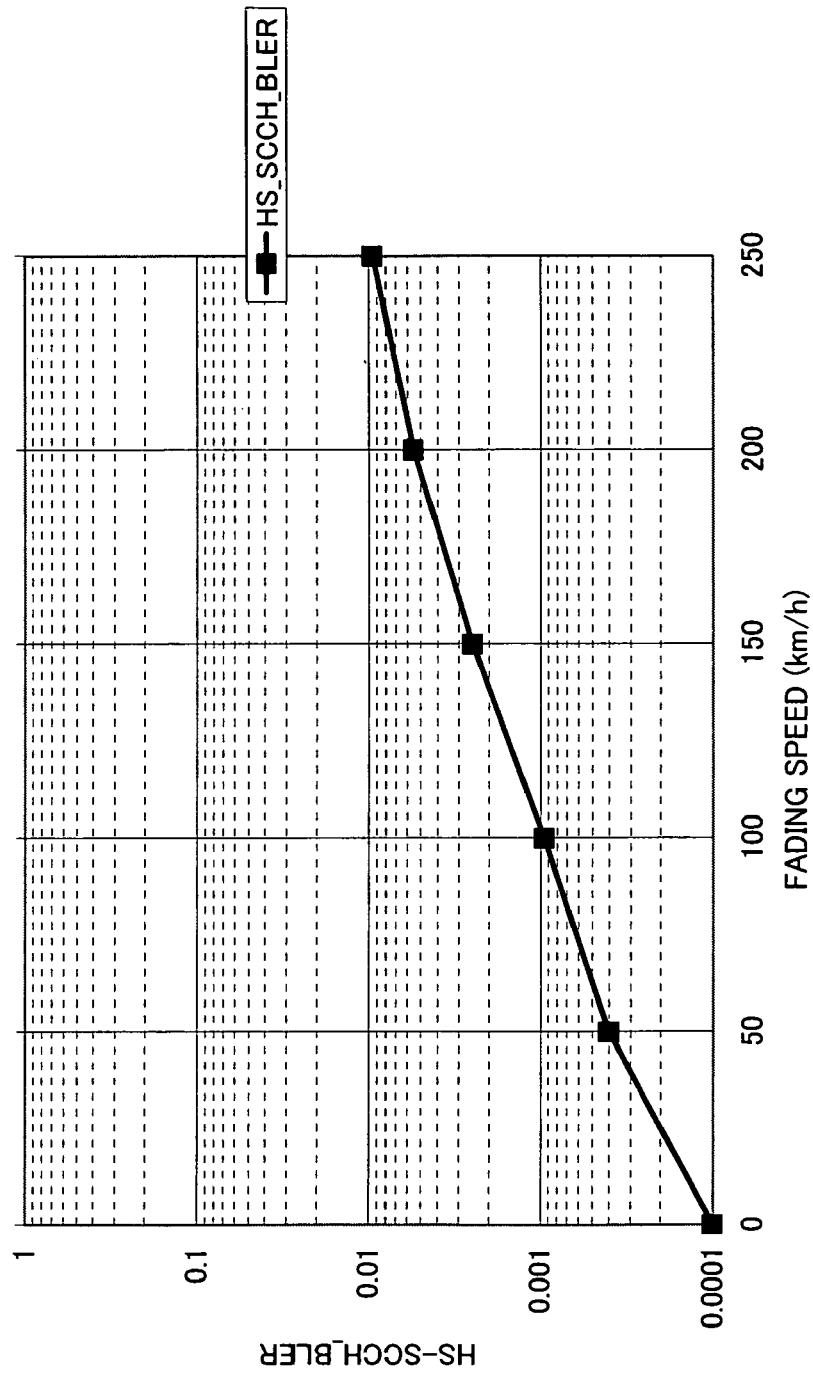
FIG. 14 is a graph quantitatively showing BLER characteristics of HS-SCCH corresponding to a fading speed in the mobile terminal of FIG. 10.

FIG. 2 is a block diagram showing a structure of a relevant part of a mobile terminal adapted to HSDPA according to a first embodiment of the present invention. The mobile terminal shown in FIG. 2 includes, for example, a channel estimation filter slide symbol number calculator 29 and an HS-SCCH symbol buffer 30 in addition to a receiver 11, a CQI reporting value calculator 12, an HS-SCCH channel estimation filter 13, an HS-SCCH channel compensator 14, an HS-SCCH demodulator 15, an HS-SCCH decoder/CRC calculator 16, an HS-PDSCH symbol buffer 17, an HS-PDSCH channel estimation filter 18, an HS-PDSCH channel compensator 19, an HS-PDSCH demodulator 20, an HS-PDSCH decoder 21, an HS-PDSCH-CRC calculator 22, a downlink reception timing monitor 23, an uplink transmission timing manager 24, a scheduler 25, an encoder 26, a modulator 27, and a transmitter 28, which include the same functions as those shown in FIG. 10, respectively. Here, the structure of the base station apparatus may be a structure of a conventional base station based on the 3GPP.

The receiver 11 performs processes such as path detection or dispreading for a downlink reception signal received with a reception antenna (not shown) and separates the downlink reception signal for each channel of CPICH, HS-SCCH, and HS-PDSCH. The CQI reporting value calculator (reception quality information detector) 12 obtains a reception SIR from a pilot signal (CPICH symbol) received by CPICH and calculates (detects) the corresponding CQI reporting value, that is, reception quality information to be reported to the base station so as to be used as a TBS determinant factor for HS-PDSCH in the base station.

The HS-SCCH channel estimation filter (channel estimation processor) 13 obtains a channel estimation value to be used for channel compensation of HS-SCCH (a first channel) in use of a plurality of CPICH symbols (known signals) received from the receiver 11. In the present embodiment, in order to use (add) a future CPICH symbol, which is received after a reception of HS-SCCH symbol for channel compensation, in the channel estimation filter process (averaging process), channel estimation time, that is, a CPICH symbol range (channel estimation filter range) for the averaging process can be slid (shifted) toward temporally future direction with respect to the HS-SCCH of channel estimation by symbol unit within the number of slide symbols obtained in the later described channel estimation filter slide symbol number calculator 29.

The HS-SCCH channel compensator 14 performs channel compensation on HS-SCCH symbol received via the HS-SCCH symbol buffer 30 in use of the channel estimation value obtained by the HS-SCCH channel estimation filter 13. The HS-SCCH demodulator 15 demodulates HS-SCCH symbols after channel compensation is performed in the HS-SCCH channel compensator 14. The HS-SCCH decoder/CRC calculator 16 decodes the HS-SCCH symbols demodulated by the HS-SCCH demodulator 15 and carries out CRC calculation.

The HS-PDSCH channel estimation filter 18 obtains a channel estimation value for HS-PDSCH from CPICH symbol separated by the receiver 11 and calculates the channel estimation value by averaging a plurality of CPICH symbols (for example, an amount of CPICH symbols of 2 slots).

The HS-PDSCH symbol buffer 17 temporarily holds and delays a reception signal (HS-PDSCH symbols) of HS-PDSCH (a second channel) separated by the receiver 11. The HS-PDSCH symbol buffer 17 delays the received HS-PDSCH symbol by symbol unit so that a channel estimation value, which is calculated by averaging a plurality of past and future CPICH symbols with respect to the CPICH symbol received at the same timing as the HS-PDSCH symbol for the channel compensation, is used for the channel compensation process of the HS-PDSCH symbol.

For example, if the number of CPICH symbols to be averaged in the HS-PDSCH channel estimation filter 18 corresponds to 2 slots, the HS-PDSCH symbol buffer 17 delays the received HS-PDSCH symbol by 1 slot so that the received HS-PDSCH symbol of channel compensation is input to the HS-PDSCH channel compensator 19 of the subsequent stage at timing of middle of the CPICH symbols of 2 slots to be averaged.

The HS-PDSCH channel compensator 19 performs a channel compensation process on the HS-PDSCH symbols delayed in the HS-PDSCH symbol buffer 17 in use of the channel estimation value obtained by the HS-PDSCH channel estimation filter 18. As a result, as mentioned above, the HS-PDSCH channel compensator 19 performs the channel compensation process of the HS-PDSCH symbols in use of the channel estimation value which is calculated by averaging a plurality of past and future CPICH symbols with respect to the HS-PDSCH symbol for the channel compensation.

The HS-PDSCH demodulator 20 demodulates the HS-PDSCH symbols after the channel compensation by the HS-PDSCH channel compensator 19. The HS-PDSCH decoder 21 decodes the HS-PDSCH symbols demodulated by the HS-PDSCH demodulator 20 in use of information (HS-PDSCH decode information) required for HS-PDSCH decoding such as spread code information obtained by the HS-SCCH decoder/CRC calculator 16. Here, in the present embodiment, as mentioned below, the HS-PDSCH decoding information is calculated after a delay within the number of slide symbols obtained by channel estimation filter slide symbol number calculator 29 so that the beginning of HS-PDSCH decoding process is delayed by the number of the slide symbols.

The HS-PDSCH-CRC calculator 22 performs CRC calculation on the HS-PDSCH symbols decoded by the HS-PDSCH decoder 21 for an error checking. The result (OK or NG) of the error checking is provided as an ACK/NACK signal.

The downlink reception timing monitor 23 monitors the downlink reception timing of each channel received by the receiver 11. The uplink transmission timing manager 24 controls uplink transmission timing so as to transmit the CQI reporting value and the ACK/NACK (DTX) to the base station apparatus respectively at the timings shown in FIG. 9 in accordance with the downlink reception timing monitored by the downlink reception timing monitor 23.

The scheduler 25 schedules transmission timing of the CQI reporting value calculated in the reporting value calculator 12, the DTX in case that the HS-SCCH decoder/CRC calculator 16 fails to decode HS-SCCH correctly (the CRC calculation result is NG), and the CRC calculation result (ACK/NACK) in the HS-PDSCH-CRC calculator 22, in accordance with the transmission timing managed by the uplink transmission timing manager 24.

The encoder 26 encodes information (CQI reporting value, ACK/NACK/DTX) which is scheduled and sequentially input by the scheduler 25 into HS-DPCCH data. The modulator 27 modulates information encoded in the encoder 26. The transmitter 28 transmits the modulated signals to the base station apparatus via transmission antenna as HS-DPCCH radio signals.

The channel estimation filter slide symbol number calculator (a remaining time calculator; hereinafter referred as to "slide symbol number calculator") 29 calculates TBS of HS-PDSCH transmitted from the base station apparatus based on the CQI reporting value calculated by the CQI reporting value calculator 12, calculates a period of time to be spent for an HS-SCCH channel estimation process (remaining time before the predetermined time ends) by symbol unit, and obtains the number of slides (the number of slide symbols (amount of delay)) of the received HS-SCCH symbols based on the calculated period of time. The TBS, HS-PDSCH decoding time (ms), and the number of slide symbols can be obtained with respect to the input CQI reporting value by storing a CQI/number of slide symbol converting table 291 in an unshown memory, for example.

In FIG. 3, it is shown that time to be required for HS-PDSCH decoding is 0.5 (ms) and the number of HS-SCCH symbols slidable with respect to the time is 10 in a range in which the CQI reporting value is from 1 to 9. Similarly, it is shown that time to be required for HS-PDSCH decoding is 0.6 (ms) and the number of HS-SCCH symbols slidable with respect to the time is 9 in a range in which the CQI reporting value is from 10 to 16. It is then shown that as the CQI reporting value becomes larger, TBS of HS-PDSCH becomes larger and more time is required for a decoding process so that the number of slidable HS-SCCH symbols reduces. It is shown that the number of slide symbols is 0 (non-slidable) in case that the CQI reporting value is 29 or 30.

The number of slide symbols obtained in the slide symbol number calculator 29 in this way is provided to the HS-SCCH symbol buffer 30, the HS-SCCH channel estimation filter 13, and the HS-PDSCH decoder 21, and a delay process is carried out by symbol unit in accordance with the number of slide symbols, respectively.

The HS-SCCH symbol buffer (delay processor) 30 buffers and delays the HS-SCCH symbols separated by the receiver 11 according to the time corresponding to the number of slide symbols obtained by the slide symbol number calculator 29 in advance to input the HS-SCCH symbols into the HS-SCCH channel compensator 14 by symbol unit in parallel with the channel estimation value obtained in the HS-SCCH channel estimator 13.

As the buffering time in the HS-SCCH symbol buffer 30 is set so as to correspond to the number of slide symbols, the channel estimation filter ranges is temporally slid toward future with respect to the HS-SCCH symbols for channel compensation by symbol unit. Therefore, channel estimation values of channel filter ranges which are temporally different can be obtained in a single HS-SCCH channel estimation filter 13 so that it contributes significantly to a simplification of structure of the apparatus.

An operation of the mobile terminal of the present embodiment, as the above described structure, will be explained with reference to FIGS. 4 and 5.

Firstly, in the mobile terminal, a reception signal received by the reception antenna (not shown) is input to the receiver 11. As described so far, processes such as path detection and a dispreading process are performed in the receiver 11 and each channel of CPICH, HS-SCCH, and HS-PDSCH is separated. The separated CPICH is input to the CQI reporting value calculator 12, the HS-SCCH channel estimation filter 13, and the HS-PDSCH channel estimation filter 18, respectively.

In the CQI reporting value calculator 12, reception SIR is obtained on the basis of a pilot signal (CPICH symbol) received via CPICH and a CQI reporting value for the reception SIR is calculated (reception quality information detecting step). In accordance with the calculated value, the number of slide symbols is obtained by the slide symbol number calculator 29 based on the converting table 291 (see FIG. 3) (remaining time calculating step).

On the other hand, the HS-SCCH reception symbols separated by the receiver 11 are buffered in the HS-SCCH symbol buffer 30 (delaying step), and then the HS-SCCH channel compensator 14 carries out channel compensation in use of the channel estimation value obtained in the HS-SCCH channel estimation filter 13 (channel compensating step). Also, the HS-PDSCH reception symbols are buffered in the HS-PDSCH symbol buffer 17, and then the HS-PDSCH channel compensator 19 performs channel compensation in use of the channel estimation value obtained in the HS-PDSCH channel estimation filter 18.

Here, in the HS-SCCH channel estimation filter 13 and the HS-SCCH symbol buffer 30 according to the present embodiment, a channel estimation filter range is temporally slid to future to optimize in accordance with the number of slide symbols obtained by the slide symbol number calculator 29 (controlling step). The optimizing process will be described below with reference to FIGS. 4 and 5. FIG. 4 is a diagram illustrating channel estimation and channel compensation processes of HS-SCCH when the number of slide symbols obtained in the slide symbol number calculator 29 is 3. Similarly, FIG. 5 is a diagram illustrating channel estimation and channel compensation processes of HS-SCCH when the number of slide symbols obtained in the slide symbol number calculator 29 is 9. In both FIGS. 4 and 5, the number of symbols in a single slot is defined as 10 of #0 to #9.

As shown in FIG. 4, the channel estimation filter range (target of averaging process) is defined as symbols for 2 slots (20 symbols). Here, when the number of slide symbols obtained in the slide symbol number calculator 29 is 3, period of time to be spent for HS-SCCH channel estimation process corresponds to amount of 3 symbols. Accordingly, focusing attention on the symbol #0 in time of the slot #n, the HS-SCCH channel estimation filter 13 may employ CPICH symbols from the fourth symbol #3 in the past slot #n−2 to the third symbol #2 in the future slot #n for an averaging process (each "Σ" in FIGS. 4 and 5 represents an averaging process) (Conventionally, only symbols from the first symbol #0 in the past slot #n−2 to the last symbol #9 in the past slot #n−1 are used.)

A channel estimation value of HS-SCCH of the target slot #n can be calculated by averaging the CPICH symbols in the channel compensation filter range within 2 slots including the 3 symbols #0, #1, and #2 in the future slot #n. Therefore, the calculation of the channel estimation value is completed after the third symbol in the slot #n.

Here, as indicated by an arrowed line 301 in FIG. 4, the HS-SCCH symbol buffer 30 delays the HS-SCCH symbols for amount of 3 symbols and inputs into the HS-SCCH channel compensator 14. Therefore, as described above, the HS-SCCH channel compensator 14 can perform a channel compensation process of the HS-SCCH symbols in slot #n in use of a channel estimation value calculated by averaging CPICH symbols for 2 slots including 3 symbols of #0, #1, and #2 in the future slot #n.

Similarly, when the number of slide symbol is 9, a period of time which can be spent for HS-SCCH channel estimation process corresponds to amount of 9 symbols. As shown in FIG. 5, focusing attention on symbol #0 in the slot #n, the HS-SCCH channel estimation filter 13 can employ CPICH symbols from the last symbol #9 in past slot #n−2 to the ninth symbol #8 in future slot #n for averaging process. Accordingly, the HS-SCCH channel estimation value for target slot #n can be calculated by averaging the CPICH symbols of 2 slots in a channel compensation filter range which include 9 symbols #0 to #8 in future slot #n.

Since the channel estimation value calculating process completes after the ninth symbol #8 in the slot #n, the HS-SCCH symbol buffer 30 delays the HS-SCCH symbols for the amount of 9 symbols and inputs into the HS-SCCH channel compensator 14, as shown with an arrowed line 302 in FIG. 5. Therefore, as described above, the HS-SCCH channel compensator 14 can perform a channel compensation process of the HS-SCCH symbols in slot #n in use of a channel estimation value calculated by averaging CPICH symbols for 2 slots including 9 symbols of #0 to #8 in the future slot #n.

In other words, the slide symbol number calculator 29 and the HS-SCCH symbol buffer 30 functions as control means for controlling the channel compensation filter range (channel estimation period) so as to include CPICH symbols which are received after the reception of the HS-SCCH symbol for channel compensation into a plurality of known signals (CPICH symbols) used for the HS-SCCH channel estimation process in accordance with remaining time before the end of the predetermined period of time (about 7.5 slots) after the completion of the decode process for HS-PDSCH reception signals.

Here, subsequent HS-SCCH demodulation processes by the HS-SCCH demodulator 15 and decode processes and CRC calculating processes by the HS-SCCH decoder 15 are carried out as before mentioned.

Further, the HS-PDSCH channel estimation process, channel compensation process, demodulation process, decode process, CRC calculation process by the HS-PDSCH channel estimation filter 18, the HS-PDSCH channel compensator 19, the HS-PDSCH demodulator 20, the HS-PDSCH decoder 21, and the HS-PDSCH-CRC calculator 22 are also performed as before mentioned. However, as described above, since information required for HS-PDSCH decoding is delayed for the amount of the number of the slide symbols and calculated by the HS-SCCH decoder/CRC calculator 16, the HS-PDSCH decoder 21 delays the beginning of the HS-PDSCH decode process for the amount of the number of slide symbols which is obtained in the slide symbol number calculator 29.

Further, after the CRC calculation processes for HS-SCCH and HS-PDSCH, also as before mentioned, the scheduler 25 performs a scheduling process for a CQI reporting value and ACK/NACK (DTX), the encoder 26 encodes the scheduled information as HS-DPCCH data, the modulator 27 modulates the encoded data, and the transmitter 28 carries out radio transmission of the modulated signals on HS-DPCCH.

In the present embodiment, the base station apparatus transmits new data when receiving ACK, retransmits HS-SCCH and HS-PDSCH when receiving DTX, and retransmits HS-PDSCH when receiving NACK.

As described above, according to the mobile terminal of the present embodiment, TBS of HS-PDSCH from the base station apparatus is calculated based on a CQI reporting value to delay (buffer process) the HS-SCCH by symbol unit as long as possible based on the calculated time and the channel estimation filter range is set to the most appropriate range even in an environment such as fading environment, in which phase of receiving wave changes, and an environment in which HS-SCCH reception characteristic is deteriorated in a bad reception condition. As a result, the accuracy of HS-SCCH channel estimation value can be improved without particular transmission power control with the base station apparatus. Therefore, reception characteristics (BLER characteristics) of HS-SCCH can be improved and a reception speed is increased so that improvement of throughput of the mobile terminal and throughput of the system can be achieved.

Figure 6:
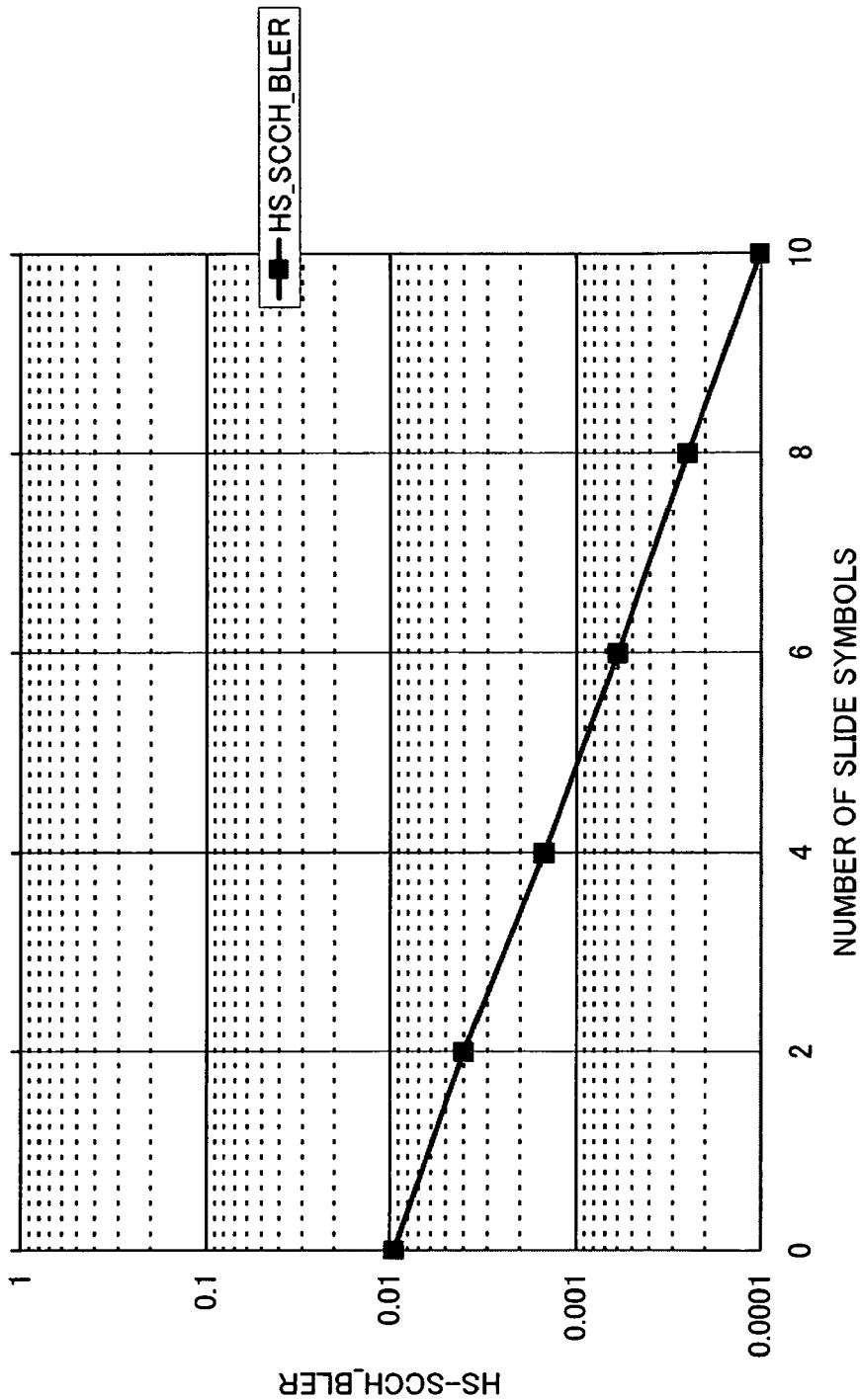
FIG. 6 is a graph showing an example of BLER characteristics of HS-SCCH corresponding to the number of slide symbols according to the first embodiment, when fading speed is 250 km.

FIG. 6 shows an example of BLER characteristics of the number of slide symbols toward HS-SCCH according to the present embodiment when the fading speed is 250 km. With reference to FIG. 6, it can be found that as the number of slide symbols becomes larger, that is, the number of the future slide symbols used for channel estimation increases, BLER characteristics of HS-SCCH are improved.

Further, the above processes are all performed only in the mobile terminal side and any particular change is not required in the base station apparatus, so that it is great in versatility.

(C) Second Embodiment

Figure 7:
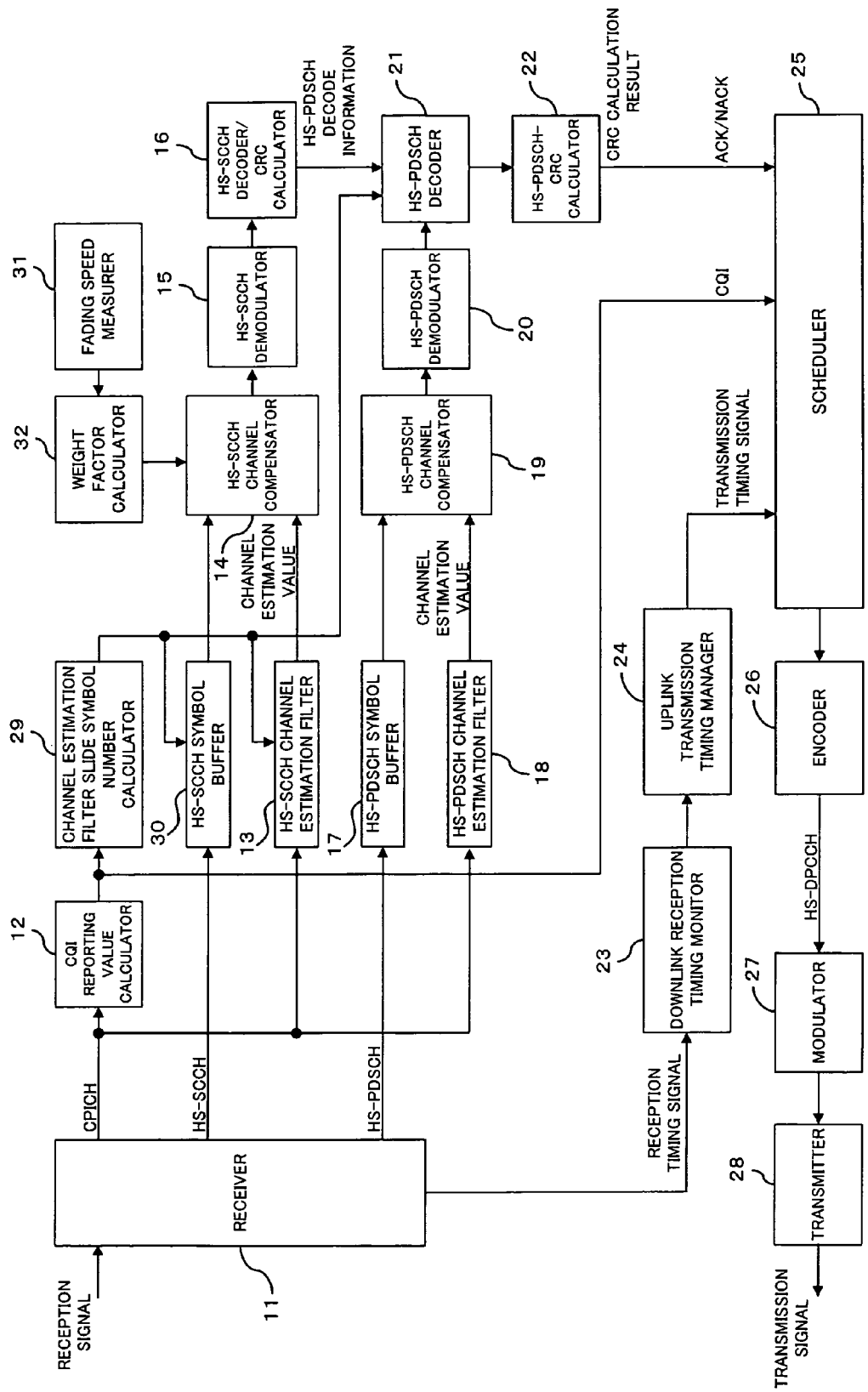
FIG. 7 is a block diagram showing a structure of a relevant part of a mobile terminal adapted to HSDPA according to a second embodiment of the present invention.

FIG. 7 is a block diagram showing a structure of a relevant part of a mobile terminal adapted to an HSDPA according to the second embodiment. Comparing to the structure of the mobile terminal in FIG. 2, the mobile terminal shown in FIG. 7 additionally includes a fading speed measurer 31 and a weighting factor calculator 32. In FIG. 7, the elements given the same reference numbers as the above described reference numbers are identical or similar to the above described elements unless otherwise noted.

The fading speed measurer 31 measures a fading speed by, for example, the Doppler frequency measurement and the weighting factor calculator (weighting controller) 32 controls weighting of a channel estimation value (CPICH symbol which is a target of averaging process) obtained by the HS-SCCH channel estimation filter 13 in accordance with the fading speed measured in the fading speed measurer 31. The weighting factor calculator 32, for example, provides a greater weight to a slot (CPICH symbol) is temporally received later within the slot (CPICH symbol) which is a target of the averaging process as the measured fading speed is faster. As a result, the weight of the averaging process is controlled to be biased toward the temporally future direction.

In other words, the weighting factor calculator 32, for example, in case of the symbol #0 at the time of slot #n in FIG. 4, the weight of CPICH symbol in slot #n−1 is set larger than that in slot #n−2 so that the weight of averaging process is controlled to be biased toward the temporally future direction.

As described above, the weight of averaging process for obtaining a channel estimation value is controlled according to the measured fading speed. Accordingly, even in a condition with high fading speed, in which HS-SCCH reception characteristics are deteriorated, accuracy of the HS-SCCH channel estimation value is improved much more than the first embodiment so as to improve HS-SCCH reception characteristics (BLER characteristics).

(D) Third Embodiment

Figure 8:
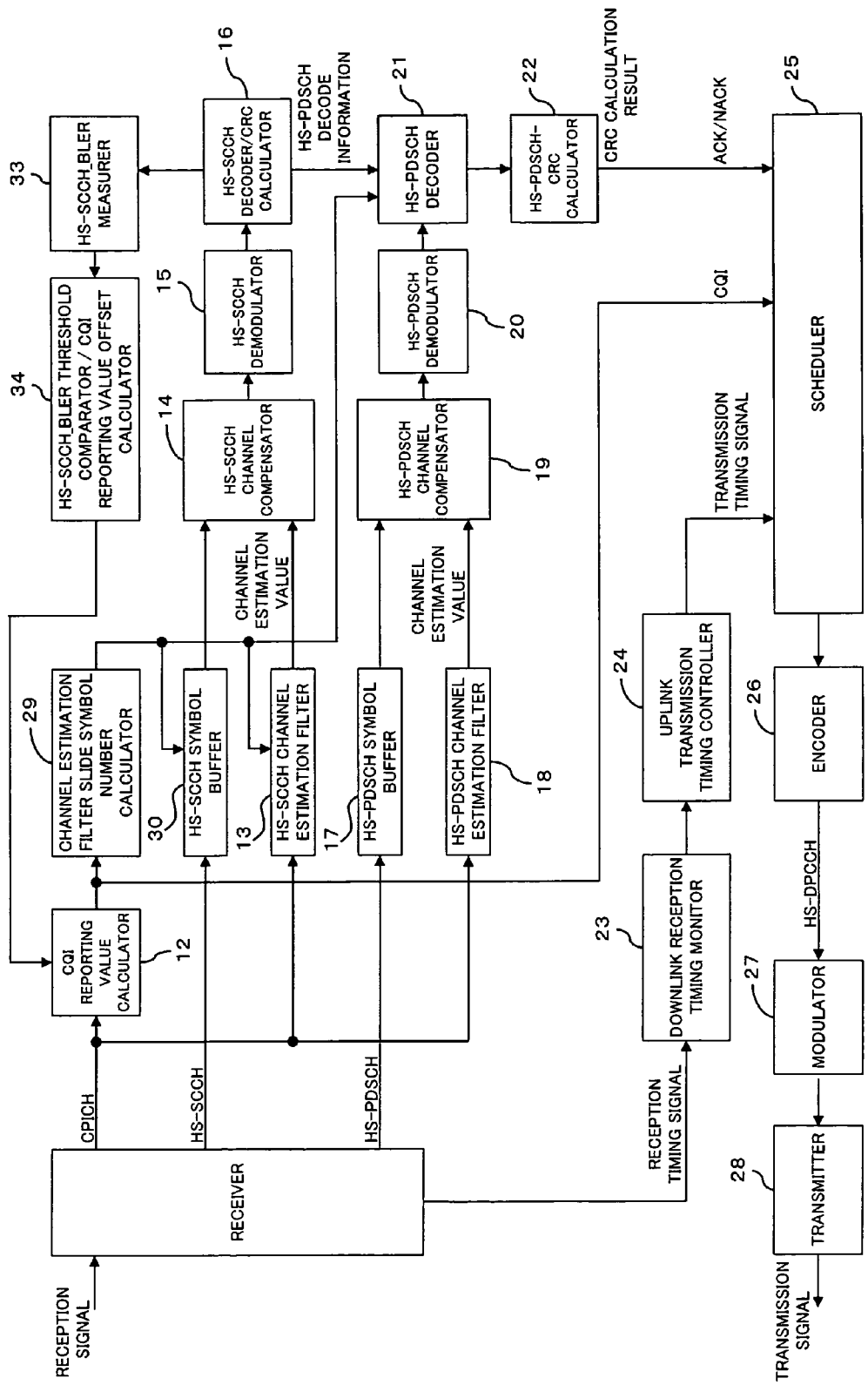
FIG. 8 is a block diagram showing a structure of a relevant part of a mobile terminal adapted to HSDPA according to a third embodiment of the present invention.

FIG. 8 is a block diagram showing a structure of a relevant part of a mobile terminal adapted to an HSDPA according to the third embodiment. Comparing to the structure of the mobile terminal in FIG. 2, the mobile terminal shown in FIG. 8 is different in that an HS-SCCH_BLER measurer 33 and an HS-SCCH_BLER threshold comperator/CQI reporting value offset calculator 34 are additionally included and a CQI reporting value calculated by the CQI reporting value calculator 12 with the offset value of the CQI reporting value obtained by the HS-SCCH_BLER threshold comperator/CQI reporting value offset calculator 34 is controlled (reduced). In FIG. 7, the elements given the same reference numbers as the above described reference numbers are identical or similar to the above described elements unless otherwise noted.

The HS-SCCH_BLER measurer (error rate measurer) 33 measures BLER of HS-SCCH by statistically processing the CRC calculation result calculated by the HS-SCCH decoder/CRC calculator 16, for example. The HS-SCCH_BLER threshold comperator/CQI reporting value offset calculator (hereinafter referred as to "threshold comperator/CQI offset calculator") 34 holds a threshold value of HS-SCCH BLER in advance, compares the threshold of the BLER measured in the HS-SCCH_BLER measurer 33, and controls to lower the CQI reporting value calculated in the CQI reporting value calculator 12 when the measured BLER is over the threshold value (that is, when the error rate is lower than a predetermined value).

For example, when the threshold value of the HS-SCCH_BLER is set as 1.00E-3 and an offset of the CQI reporting value in the case is set as "−1", the threshold comperator/CQI offset calculator 34 revises the CQI reporting value calculated by the CQI reporting value calculator 12 to a CQI reporting value which is reduced by 1 if the measured result of HS-SCCH_BLER for one second is deteriorated and lower than 1.00E-3.

In other words, the threshold comperator/CQI offset calculator 34 measures HS-SCCH_BLER with the CQI reporting value calculator 12 and also, functions as a reception quality information revising reporter for reporting the CQI reporting value lower than the CQI reporting value calculated in the CQI reporting value calculator 12 to the base station apparatus when the error rate is lower than a predetermined value.

Thereby, TBS (amount of transmission data) of HS-PDSCH transmitted from the base station apparatus to the mobile terminal can be reduced. In the mobile terminal, time to be spent for the HS-SCCH channel estimation process can be prolonged and the number of slide symbols calculated in the slide symbol number calculator 29 can be increased. Accordingly, even when the HS-SCCH_BLER is deteriorated, HS-SCCH reception characteristics (error rate) can be improved positively on the initiative of the mobile terminal.

Further, the CQI reporting value is controlled in the mobile terminal side so that, also in the present embodiment, any particular change is not required in the base station apparatus and it is great in versatility.

Here, in the present embodiment, the CQI reporting value reported to the base station apparatus is revised to smaller to reduce TBS of HS-PDSCH. However, this function may be achieved by requesting the base station apparatus to reduce TBS of HS-PDSCH substitute for providing the CQI reporting value.

(E) Others

It will be appreciated that the present invention is not limited to the above described embodiments and can be implemented with modifications without departing from the gist of the present invention.

For example, in the above embodiments, the channel estimation filter range is controlled and slid toward temporally future direction without changing the number of symbols which are targets of the averaging process. However, the number of symbols which are targets of the averaging process may be changed during the sliding control. Further, control may be performed with extended control toward future direction substitute for the sliding control.

In other words, it may be satisfied if it is controlled so as to at least include future CPICH symbols received after the reception of HS-SCCH symbols which are targets of the channel compensation into the filter range (weight of the averaging process is biased toward temporally future direction). Here, HS-SCCH reception characteristics are sometimes improved by changing the number of symbols which are target of the averaging process without performing the sliding control, however, as the above described embodiments, fundamental solution cannot be achieved without using the future CPICH symbol.

Further, in the above described embodiments, TBS of HS-PDSCH transmitted from the base station apparatus is calculated in use of a CQI reporting value transmitted by the mobile terminal to calculate time to be spent for an HS-PDSCH decoding process and time to be spent for HS-SCCH channel estimation process. However, the time may be calculated based on the capability for HS-PDSCH channel estimation, demodulation, decoding process (processing capability).

As described above, according to the present invention, accuracy of a channel estimation value of a first channel is improved by optimally controlling a channel estimation range so as to improve the reception characteristics of the first channel and reception characteristic of a second channel, also, even in an environment such as fading environment, in which phase of receiving wave changes, and an environment in which reception characteristic of the first channel is deteriorated in a bad reception condition. Therefore, a reception speed is improved in the mobile terminal apparatus to improve throughput of the mobile terminal apparatus and throughput of the system so that it is extremely useful in a technical field of mobile communications.

What is claimed is:

1. A mobile terminal apparatus for decoding a first channel reception signal received from a base station apparatus after a channel compensation process in use of a channel estimation value so as to carry out a decode process on a second channel reception signal received from the base station apparatus in use of the decoding result of the first channel reception signal, wherein a period of time from a completion of receiving said second channel reception signal to a completion of decoding the second channel reception signal is regulated as a predetermined time, said apparatus comprising:

a channel estimation processor configured to obtain the channel estimation value of said first channel reception signal by using a plurality of known signals received from the base station apparatus within a channel estimation period;

a channel compensation processor configured to carry out a channel compensation process of said first channel reception signal by using the channel estimation value obtained by said channel estimation processor; and a controller configured to control said channel estimation period so as to include a known signal which is received after the reception of said first channel reception signal for channel compensation into said plurality of known signals in accordance with remaining time from completion of the decoding process on said second channel reception signal until the end of said predetermined time.

2. The mobile terminal apparatus according to claim 1, wherein the controller further comprises:

a reception quality information detector configured to detect reception quality information, from said known signals, which is used as a determinant factor of the transmission data amount of said second channel in the base station apparatus and is reported to the base station apparatus;

a remaining time calculator configured to obtain said remaining time based on said reception quality information detected by the reception quality information detector; and a delay processor configured to delay said first channel reception signal in accordance with said remaining time obtained by the remaining time calculator so as to input into the channel compensation processor parallel to the channel estimation value obtained by the channel estimation processor.

3. The mobile terminal apparatus according to claim 2, wherein the controller further comprises:

a fading speed measurer configured to measure a fading speed; and a weighting controller configured to control weighting of said plurality of known signals during said channel estimation period in accordance with the fading speed measured by the fading speed measurer.

4. The mobile terminal apparatus according to claim 3, wherein the weighting controller is configured to assign a greater weight to the known signal that is received later during said channel estimation period as the fading speed measured by the fading speed measurer is faster.

5. The mobile terminal apparatus according to claim 2, wherein the controller further comprises:

an error rate measurer configured to measure an error rate of said first channel reception signal; and a reception quality information revising reporter configured to report lower reception quality information than the reception quality information detected by the reception quality information detector to the base station apparatus so as to reduce the amount of transmission data of said second channel from the base station apparatus and increase said remaining time when the error rate measured by the error rate measurer is lower than a predetermined value.

6. The mobile terminal apparatus according to claim 1, wherein the controller further comprises:

a fading speed measurer configured to measure a fading speed; and a weighting controller configured to control weighting of said plurality of known signals during said channel estimation period in accordance with the fading speed measured by the fading speed measurer.

7. The mobile terminal apparatus according to claim 6, wherein the weighting controller is configured to assign a greater weight to the known signal that is received later during said channel estimation period as the fading speed measured by the fading speed measurer is faster.

8. The mobile terminal apparatus according to claim 1, wherein said first channel is an HS-SCCH (High Speed-Shared Control Channel) of an HSDPA (High Speed Downlink Packet Access) system and said second channel is an HS-PDCH (High Speed-Physical Downlink Shared Channel) of said HSDPA system.

9. A method of channel compensation in a mobile terminal apparatus for decoding a first channel reception signal received from a base station apparatus after a channel compensation process by using a channel estimation value so as to carry out a decode process on a second channel reception signal received from the base station apparatus in use of the decoding result of the first channel reception signal, wherein a period of time from a completion of receiving said second channel reception signal to a completion of decoding the second channel reception signal is regulated as a predetermined time, said method comprising:
 a channel estimating step for obtaining the channel estimation value of said first channel reception signal by using a plurality of known signals received from the base station apparatus within a channel estimation period;
 a channel compensating step for performing channel compensating process for said first channel reception signal by using the channel estimation value obtained in the channel estimating step; and
 a controlling step for controlling said channel estimation period so as to include a known signal which is received after the reception of said first channel reception signal for channel compensation into said plurality of known signals in accordance with remaining time from a completion of the decoding process on said second channel reception signal until the end of said predetermined time.

10. The method of channel compensation in a mobile terminal apparatus according to claim 9,
 wherein the controlling step includes:
  a reception quality information detecting step for detecting reception quality information, from said known signals, which is used as a determinant factor of the transmission data amount of said second channel in the base station apparatus and is reported to the base station apparatus;
  a remaining time calculating step for calculating said remaining time based on said reception quality information detected in the reception quality information detecting step; and
  a delay processing step for delaying said first channel reception signal in accordance with said remaining time obtained in the remaining time calculating step so as to use in the channel compensating step with said channel estimation value in parallel.

11. The method of channel compensation in a mobile terminal apparatus according to claim 10,
 wherein the controlling step includes:
  a fading speed measuring step for measuring a fading speed; and
  a weighting controlling step for controlling weighting of said plurality of known signals during said channel estimation period in accordance with the fading speed measured in the fading speed measuring step.

12. The method of channel compensation in a mobile terminal apparatus according to claim 11,
 wherein, in the weighting controlling step, a greater weight is assigned to the known signal that is received later during said channel estimation period as the fading speed measured in the fading speed measuring step is faster.

13. The method of channel compensation in a mobile terminal apparatus according to claim 10,
 wherein the controlling step includes:
  an error rate measuring step for measuring an error rate of said first channel reception signal; and
  a reception-quality-information-revising reporting step for reporting lower reception quality information than the reception quality information detected in the reception quality detecting step to the base station apparatus so as to reduce the amount of transmission data of said second channel from the base station apparatus and increase said remaining time when the error rate measured in the error rate measuring step is lower than a predetermined value.

14. The method of channel compensation in a mobile terminal apparatus according to claim 9,
 wherein the controlling step includes:
  a fading speed measuring step for measuring a fading speed; and
  a weighting controlling step for controlling weighting of said plurality of known signals during said channel estimation period in accordance with the fading speed measured in the fading speed measuring step.

15. The method of channel compensation in a mobile terminal apparatus according to claim 14,
 wherein, in the weighting controlling step, a greater weight is assigned to the known signal that is received later during said channel estimation period as the fading speed measured in the fading speed measuring step is faster.

16. The method of channel compensation in a mobile terminal apparatus according to claim 9,
 wherein said first channel is an HS-SCCH (High Speed-Shared Control Channel) of an HSDPA (High Speed Downlink Packet Access) system and said second channel is an HS-PDCH (High Speed-Physical Downlink Shared Channel) of the HSDPA system.

* * * * *